United States Patent
Juzak et al.

(10) Patent No.: US 12,025,178 B2
(45) Date of Patent: Jul. 2, 2024

(54) WALL MOUNTING BRACKET FOR CHANNEL PROFILE ELEMENT

(71) Applicant: J. VAN WALRAVEN HOLDING B.V., Mijdrecht (NL)

(72) Inventors: Marek Juzak, Mijdrecht (NL); Frank Nijdam, Harderwijk (NL)

(73) Assignee: J. VAN WALRAVEN HOLDING B.V., Mijdrecht (NL)

( * ) Notice: Subject to any disclaimer, the term of this patent is extended or adjusted under 35 U.S.C. 154(b) by 0 days.

(21) Appl. No.: 17/775,748

(22) PCT Filed: Nov. 10, 2020

(86) PCT No.: PCT/EP2020/081605
§ 371 (c)(1),
(2) Date: May 10, 2022

(87) PCT Pub. No.: WO2021/094295
PCT Pub. Date: May 20, 2021

(65) Prior Publication Data
US 2022/0389947 A1    Dec. 8, 2022

(30) Foreign Application Priority Data

Nov. 11, 2019 (NL) .................................... 2024208

(51) Int. Cl.
*F16B 9/00* (2006.01)

(52) U.S. Cl.
CPC .................................... *F16B 9/052* (2018.08)

(58) Field of Classification Search
CPC ................. E04B 1/2608; E04B 7/045; E04B 2001/2415; E04B 2001/2469;
(Continued)

(56) References Cited

U.S. PATENT DOCUMENTS

| 4,611,947 A | 9/1986 | Baus |
| 4,923,165 A * | 5/1990 | Cockman ............ E04H 12/2223 52/157 |

(Continued)

FOREIGN PATENT DOCUMENTS

| CN | 103477096 A | 12/2013 |
| CN | 108953324 A | 12/2018 |

(Continued)

OTHER PUBLICATIONS

International Search Report for PCT/EP2020/081605 dated Jan. 21, 2021 (2 pgs).

(Continued)

*Primary Examiner* — Josh Skroupa
(74) *Attorney, Agent, or Firm* — Tutunjian & Bitetto, P.C.

(57) ABSTRACT

A wall mounting bracket for mounting a channel profile element to a wall surface includes a wall plate to be mounted to the wall surface, and at least one support for supporting an end portion of the channel profile element. The support is attached to and extends from the wall plate. The support includes at least one wall portion having fastening apertures. The support includes at least a first support profile and a second support profile. In use the first support profile bears against an exterior side of one of the opposing walls of the channel profile element and the second support profile bears against an interior side of the other one of the opposing walls of the channel profile element.

7 Claims, 4 Drawing Sheets

(58) Field of Classification Search
CPC .............. E04F 11/1804; E04F 11/1812; E04F 11/1846; E04H 12/2253; E04H 12/2261; E04H 12/2269; E04H 12/2276; E04H 17/1488; F16B 9/02; F16B 9/05; F16B 9/052; F16B 9/058; F16B 12/44; F16B 12/50; F16B 12/52; Y10T 403/4642; Y10T 403/4674; Y10T 403/4681; Y10T 403/7043
USPC ........... 256/65.03, 65.06; 403/245, 256, 258, 403/363
See application file for complete search history.

(56) References Cited

U.S. PATENT DOCUMENTS

| | | | | |
|---|---|---|---|---|
| 5,123,623 | A * | 6/1992 | McNamara | E04H 12/2253 248/156 |
| 7,125,002 | B2 * | 10/2006 | Platt | E04H 17/1488 256/65.03 |
| 8,011,148 | B2 * | 9/2011 | Bertke | E04F 11/1812 52/79.5 |
| 8,141,830 | B1 * | 3/2012 | Hudson | E04G 21/1808 33/408 |
| 9,062,467 | B1 * | 6/2015 | Hanson | B25B 5/142 |
| 9,816,286 | B2 * | 11/2017 | Cavanagh | E04H 12/2269 |
| 10,233,953 | B1 * | 3/2019 | McGann | F16B 9/05 |
| 10,344,483 | B2 * | 7/2019 | Yu | E04F 11/1846 |
| 10,702,724 | B2 * | 7/2020 | Subzda | E04G 21/3223 |
| 11,421,436 | B2 * | 8/2022 | Lisle | E04H 12/2269 |
| 2016/0357091 | A1 | 12/2016 | Jaconssob et al. | |

FOREIGN PATENT DOCUMENTS

| | | | | |
|---|---|---|---|---|
| DE | 9416963 | U1 | 12/1994 | |
| DE | 29622766 | U1 * | 7/1997 | ......... E04H 12/2276 |
| GB | 2180741 | A * | 4/1987 | ............. F16B 12/44 |
| WO | 2016141406 | A1 | 9/2016 | |

OTHER PUBLICATIONS

Chinese Office Action issued in corresponding Application No. 202080077608.8 dated Sep. 29, 2023 (5 pgs).

\* cited by examiner

WALL MOUNTING BRACKET FOR CHANNEL PROFILE ELEMENT

FIELD OF THE INVENTION

The invention relates to a wall mounting bracket for mounting an elongate channel profile element to a wall surface, wherein said elongate channel profile element comprises two opposing walls and an interconnecting wall extending perpendicularly to the opposing walls. The wall mounting bracket comprises a wall plate to be mounted to the wall surface, and at least one support for supporting an end portion of the channel profile element. The support is attached to and extending from the wall plate and configured to bear at least against the opposing walls of the channel profile element, said support comprising at least one wall portion having apertures for passing through fastening means to fasten the channel profile element to the support.

BACKGROUND OF THE INVENTION

Wall mounting brackets for mounting profiled channel elements, e.g. rail profiles to a wall surface are known in the art. A well-known wall mounting bracket comprises a wall plate and a U-shaped profile attached to the wall plate. A rail profile to be attached to the wall is received with an end portion in the U-shaped profile. The rail profile is attached to the U-shaped profile by means of fastening elements such as screws or bolts which are passed through aligned apertures in the U-shaped profile and in the rail profile. A disadvantage of the known wall mounting bracket is that the distance between the legs of the U-shape in general must be larger than the outer width of the rail profile, because otherwise it could become difficult to insert the rail profile between the legs of the U-shaped profile due to manufacturing tolerances. However, if the lateral walls of the rail profile are attached to the legs of the U-shape by means of a threaded fastening element such as a screw, the lateral walls can be deformed and spread. This is undesired, because components which have to be mounted to the rail profile, may not fit properly anymore if the rail profile is distorted.

The invention has for an object to provide an alternative wall mounting bracket in which the above mentioned disadvantage is at least mitigated.

SUMMARY OF THE INVENTION

This object is achieved by a wall mounting bracket for mounting an elongate channel profile element to a wall surface, wherein said elongate channel profile element comprises two opposing walls and an interconnecting wall extending perpendicularly to the opposing walls, said wall mounting bracket comprising:
 a wall plate to be mounted to the wall surface, and
 at least one support for supporting an end portion of the channel profile element, said support being attached to and extending from the wall plate and configured to bear at least against the opposing walls of the channel profile element, said support comprising at least one wall portion having apertures for passing through fastening means to fasten the channel profile element to the support,
 wherein the support comprises at least a first support profile and a second support profile, which are configured and arranged on the base plate such that the first support profile in use bears against an exterior side of one of the opposing walls of the channel profile element and the second support profile in use bears against an interior side of the other one of the opposing walls of the channel profile element.

Thus instead of one support profile that receives the channel profile, which is the case in the mentioned known wall mounting bracket with a U-shaped support profile that is on the exterior of the channel profile, the wall mounting bracket of the invention bears against the outer side and the inner side of the respective opposing walls. By positioning one of the support profiles at the outside of the channel profile and another at the inside of the channel profile it is ensured that the opposing walls of the rail profile are pulled in the same direction when secured to the support profiles. Moreover, a channel profile can always be easily fitted on this wall mounting bracket of the invention. If the channel profile is too wide only the first support profile will engage one of the opposing walls of the channel profile. If it is too narrow only the second profile will engage one of the opposing walls of the channel profile. If the channel profile is just right, both the first and second support profile will engage the opposing walls of the channel profile.

In a possible embodiment of the wall mounting bracket at least one of the first and second support profiles is configured as an L-shaped profile which has a wall portion bearing in use against one of the opposing walls of the channel element and another perpendicular wall portion bearing in use against the interconnecting wall of the channel profile element.

In a further possible embodiment both the first and second support profiles are configured as an L-shaped profile. The first L-shaped profile has a first angle, and the second L-shaped profile has a second angle. Advantageously two L-shaped profiles provide two rigid support profiles, which can withstand bending forces in two directions. In a possible further embodiment the bisector of the first angle and the bisector of the second angle may intersect, preferably perpendicularly. This embodiment is suitable for use with channel profiles embodied as a rail profile having in general a C-shaped cross section. In an alternative embodiment the first and second profiles may be arranged such that the angles of the first and second profiles are facing each other. This embodiment is suitable also for tubular channel profiles, e.g. profiles having a rectangular cross section and a closed contour.

In a possible embodiment the first L-shaped profile has longer legs than the second L-shaped profile. Preferably the first L-shaped profile provides the most of the support, while the other L-shaped profile provides an additional attachment point to warrant a sturdy attachment of the channel profile to the wall mounting bracket.

In another possible embodiment at least one of the first and second support profiles is configured as a flat strip, while the other one of the first and second support profiles is configured as an L-shaped profile.

In any of the embodiments having two L-shapes, or one L-shaped profile and one flat strip, there is a space between the support profiles, in which the interconnecting wall—in case of a rail profile, a bottom wall—is received. During fitting of the channel profile the bottom wall is inserted in said space and the channel profile can be shifted in a direction parallel to the interconnecting wall until one or both of the opposing walls of the channel profile abut the corresponding first and/or second support profiles. This makes the installation of the channel element on the wall mounting bracket comfortable.

In a possible embodiment the first support profile and the second support profile have approximately the same length.

In a practical embodiment the first and second support profile are welded to the wall plate. In particular when the wall plate and the support profiles are made of steel they may be welded together by a common welding process.

The invention furthermore relates to an assembly comprising a wall mounting bracket as described in the above and an elongate channel profile element comprising two opposing walls and an interconnecting wall extending perpendicularly to the opposing walls.

The invention also relates to a mounting assembly comprising:
- an elongate channel profile element having two opposing walls and an interconnecting wall extending perpendicularly to the opposing walls;
- a wall mounting bracket, the wall mounting bracket having
- a wall plate,
- at least a first support profile attached to and extending from the wall plate, and
- a second support profile attached to and extending from the wall plate; wherein said first and second support profiles are configured and arranged on the base plate such that the first support profile in a mounted state bears against an exterior side of one of the opposing walls of the channel profile element and the second support profile in the mounted state bears against an interior side of the other one of the opposing walls of the channel profile element, and wherein at least one of the first and second support profiles has a wall portion having apertures for passing through fastening means to fasten the channel profile element to the support profile.

The invention also relates to a method for mounting an elongate channel profile element to a wall surface, wherein the elongate channel profile element has two opposing walls and an interconnecting wall extending perpendicularly to the opposing walls, the method including the following steps:
- providing a wall mounting bracket as described in the above;
- positioning the wall plate against the wall surface;
- fastening the wall plate against the wall surface;
- arranging an end of the channel profile against the wall plate such that the first support profile bears against an exterior side of one of the opposing walls of the channel profile element and the second support profile in use bears against an interior side of the other one of the opposing walls of the channel profile element;
- tightening the opposing walls respectively against the first support profile and second support profile by means of fastening elements, such as screws or bolts.

The invention also relates to a wall mounting bracket having:
- a wall plate;
- a first support profile attached to and extending from the wall plate and adapted to fit against an outer side of an end portion of an elongate channel profile element; and
- a second support profile spaced apart from the first support profile and attached to and extending from the wall plate and adapted to be inserted in an open end of the channel profile element;
- wherein at least one of the first and second support profiles has a wall portion having apertures for passing through fastening means to fasten the channel profile element to the support profile.

The invention will be further elucidated in the following detailed description with reference to the drawings.

DETAILED DESCRIPTION

Figure 1:
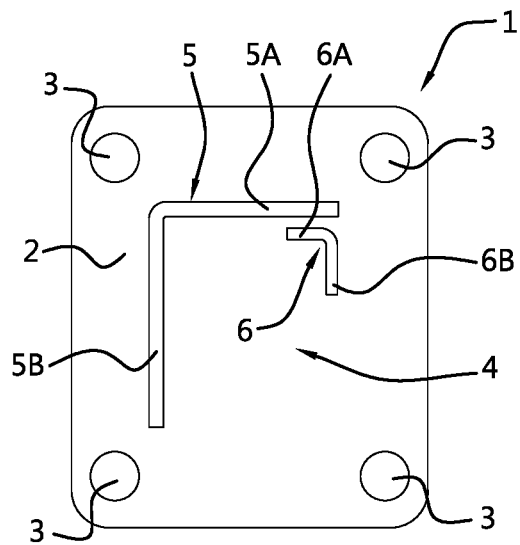
FIG. 1 shows a front elevational view of an embodiment of a wall mounting bracket according to the invention.
Figure 2:
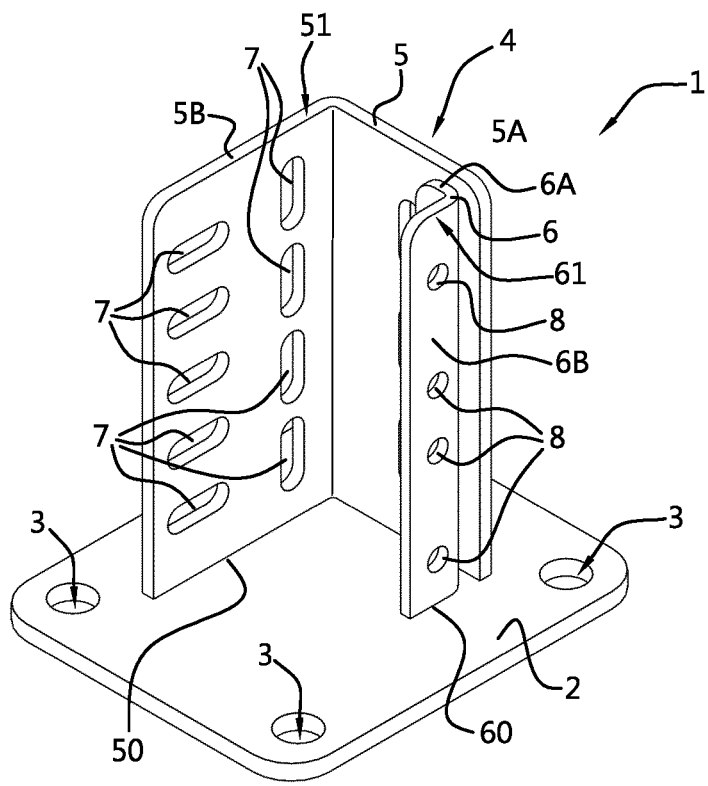
FIG. 2 shows a view in perspective of the wall mounting bracket of FIG. 1.

In FIGS. 1 and 2 is shown a wall mounting bracket 1 to attach an elongate profile element, in the current example a rail profile 10 to a will surface. The rail profile 10 has generally a C-shaped cross section and comprises a bottom wall 11, two opposite lateral walls 12 extending from the bottom wall 11. At the end of the lateral walls remote from the bottom wall flanges 13 are formed, which delimit between them a longitudinal slot 14. In the example shown in the figures the flanges 13 are bent inwardly, which is typical for rail profiles which are known in the field as "strut rails".

It should be noted that a rail profile 10 is used as an example, but that a bracket according to the invention can also be applied in combination with other hollow profiles, for example tubular profiles having for example a rectangular cross section as will be described further below with reference to FIGS. 8 and 9.

In a practical embodiment the wall mounting bracket 1 is made of metal, preferably steel.

The wall mounting bracket 1 comprises a wall plate 2 which is intended to be placed against a wall surface, which wall plate 2 is provided with bores 3 through which screws or other suitable fastening means can pass to mount the wall mounting bracket 1 to the wall surface. It should be noted that a wall surface can be the surface of a wall, a ceiling, a floor or any other partition surface.

The wall mounting bracket 1 furthermore comprises a support 4 which is adapted to support the profile element, in this example the rail profile 10. In the embodiment shown here the support 4 comprises a first L-shaped support profile 5 and a second L-shaped profile 6. In a practical embodiment the first and second profiles 5, 6 have a proximal end 50, 60 positioned against the wall plate 2 and a distal end 51, 61 remote from the wall plate 2. The first and second profiles 5, 6 extend preferably substantially perpendicular to the wall plate 2. The proximal ends 50, 60 of the respective first and second profiles 5, 6 are attached to, preferably welded, to the wall plate 2.

Figure 3:
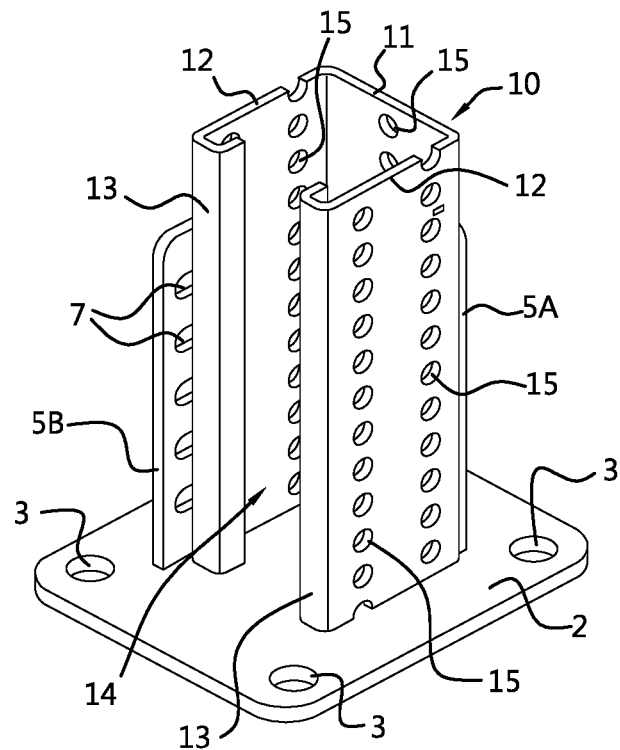
FIG. 3 shows a view in perspective of the wall mounting bracket of FIG. 1 assembled with a rail profile.
Figure 4:
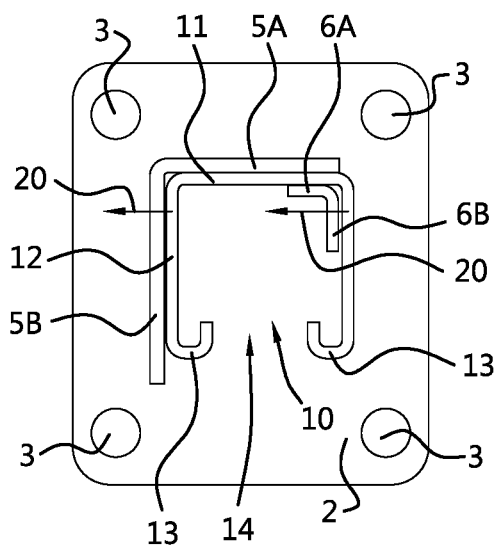
FIG. 4 shows a front elevational view of the wall mounting bracket of FIG. 1 assembled with a rail profile.

The first profile 5 has an L-shape having two legs 5A, 5B. The first profile 5 is dimensioned to fit against an outer side of the rail profile 10, as is shown in FIGS. 3 and 4. One of the legs 5A of the L-shape is lying against an outer side of the bottom wall 11 of the rail profile 10, and the other leg 5B is lying against an outer side of one of the opposing lateral walls 12 of the rail profile 10.

The second profile 6 has an L-shape having two legs 6A, 6B. The second profile 6 is dimensioned to fit inside the rail profile 10. One of the legs 6A of the L-shape is lying against an inner side of the bottom wall 11 of the rail profile 10, and the other leg 6B is lying against an inner side of one of the opposing lateral walls 12 of the rail profile 10.

The leg 6A of the second profile 6 runs parallel to the leg 5A of the first profile 5. The legs 5A and 6A are spaced apart and the distance between them slightly exceeds the thickness of the bottom wall 11 of the profile channel 10, whereby the bottom wall 11 can be moved between the legs 5A and 6A. The other legs 5B and 6B of the respective profiles 5 and 6 are parallel to each other.

Figure 7:
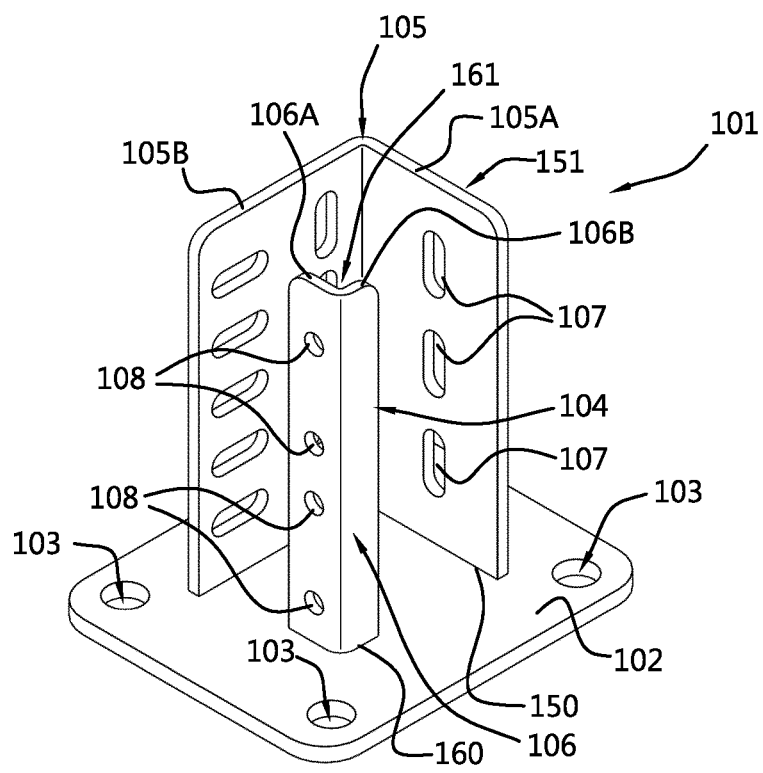
FIG. 7 shows a view in perspective of the wall mounting bracket of another embodiment of a wall mounting bracket according to the invention.

In the embodiment shown in FIGS. 1 and 2 the angles of the respective L-shaped profiles 5, 6 are arranged such that the bisectors of the angles intersect each other. Since the angles are 90°, the bisectors will be perpendicular to each other. This embodiment is suitable for use with rail profiles, because the profiles 5 and 6 respectively engage the angle portions between the bottom wall 11 and the respective lateral walls 12 of the rail profile 10. However, in other possible embodiments, which are not necessarily for use with rail profiles, but also in rectangular tubular profiles, it is also possible that the L-shaped profiles are arranged such that the angles of the profiles are facing each other. Such an embodiment is shown in FIGS. 7-9, which will be described further below. It is also possible that only the external profile 5 has an L-shape, whereas the internal profile 6 is not angular, but only comprises a straight wall 6B, which engages the inner side of one of the lateral walls 12 of the rail profile 10 in the mounted state.

Figure 5:
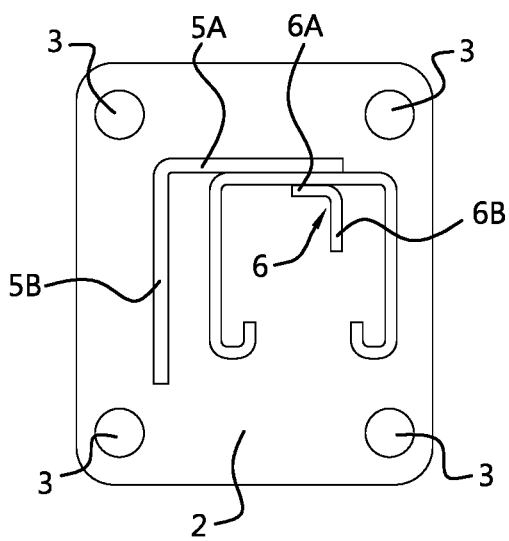
FIG. 5 shows a front elevational view of the wall mounting bracket of FIG. 1 during assembly with the rail profile.
Figure 6:
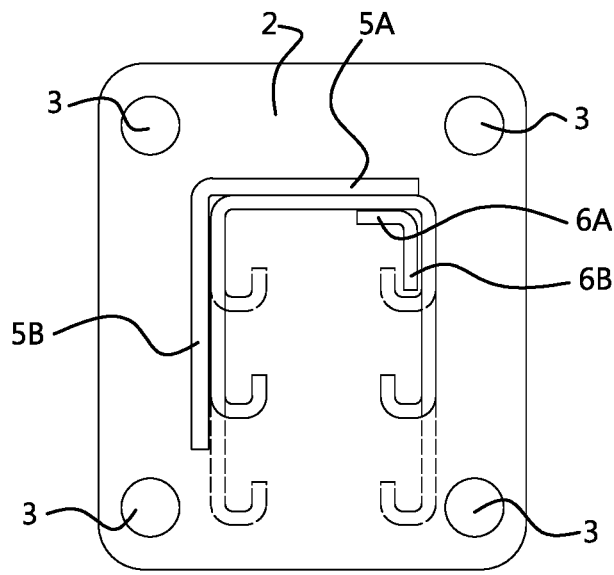
FIG. 6 illustrates in a front elevational view the mounting bracket of FIG. 1 combined with three rail profiles of different sizes.

In use, during mounting the rail profile 10 to the bracket 1, the distal end of the second profile 6 is inserted in the open end of the rail profile 10, as is shown in FIG. 5, until the end of the profile rail 10 abuts the wall plate 2. Next, the rail profile 10 is shifted, in FIG. 5 to the left such that the lateral wall 12 comes to rest against the leg 5B of the external first profile 5 and at the same time the other lateral wall 12 comes to rest against the leg 6B of the internal second profile 6 as is shown in FIG. 4.

The legs 5A, 5B, 6A, 6B of the profiles 5 and 6 can be provided with apertures 7 for passing through fastening means. As is shown in FIG. 3 the rail profile 10 may be provided with rows attachment holes 15 in the lateral walls 12 and in the bottom wall 11. Suitable fastening elements, such as for example self-tapping screws may be passed through the apertures 7 and screwed into the holes 15. By tightening the fastening elements the lateral wall 12 is pressed against the leg 5B and the other lateral wall 12 is pressed against the leg 6B. The tightening forces work in the same direction which is indicated by the arrows 20 in FIG. 4. Due to this, the lateral walls 12 of the rail profile 10 will not be spread apart. Since the distance between the profiles 5 and 6 is adapted to the dimension of the rail profile, the legs 5B and 6B will fit nicely against the lateral walls 12 without any noticeable deformation when the fastening elements are tightened.

Figure 8:
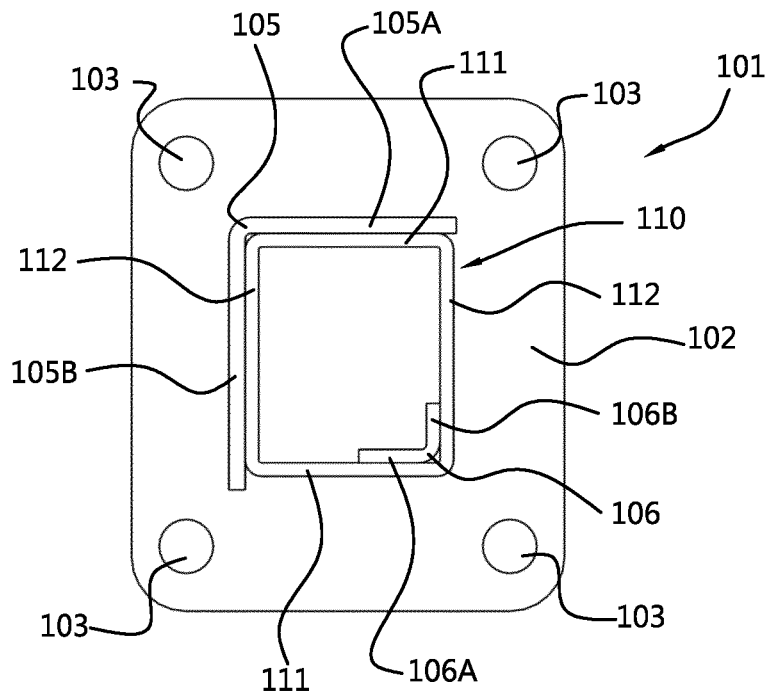
FIG. 8 shows a front elevational view of the wall mounting bracket of FIG. 7 assembled with a tubular profile.
Figure 9:
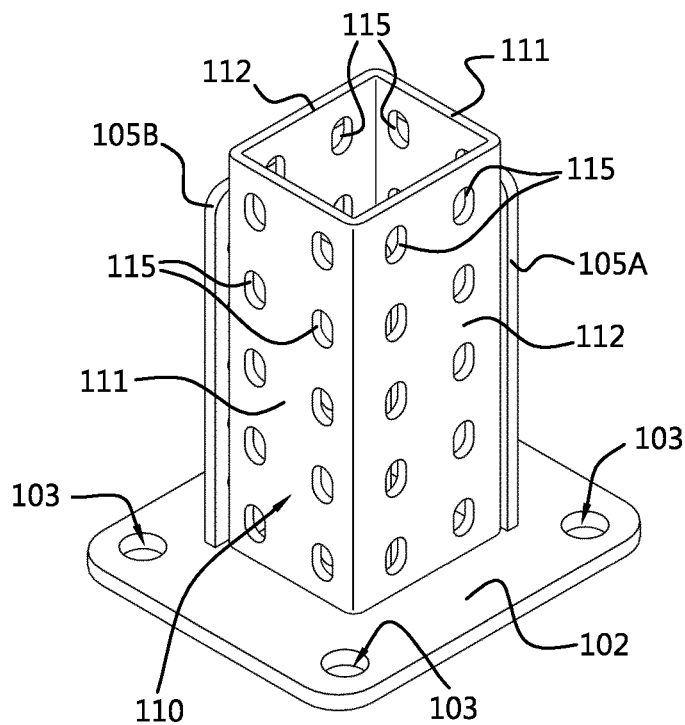
FIG. 9 shows a view in perspective of the wall mounting bracket of FIG. 7 assembled with the tubular profile.

In FIGS. 7-9 another embodiment of a wall mounting bracket according to the invention is shown.

The wall mounting bracket 101 comprises a wall plate 102 which is intended to be placed against a wall surface, which wall plate 102 is provided with bores 103 through which screws or other suitable fastening means can pass to mount the wall mounting bracket 101 to the wall surface. It should be noted again that a wall surface can be the surface of a wall, a ceiling, a floor or any other partition surface.

The wall mounting bracket 101 furthermore comprises a support 104 which is adapted to support the profile element, in this example a tubular profile 110. The tubular profile 110 has in this example a rectangular cross section having two opposing parallel walls 111 and two opposing parallel walls 112. The walls 111 and 112 are oriented rectangular with respect to each other. In the embodiment shown here the support 104 comprises a first L-shaped support profile 105 and a second L-shaped profile 106. In a practical embodiment the first and second profiles 105, 106 have a proximal end 150, 160 positioned against the wall plate 102 and a distal end 151, 161 remote from the wall plate 102. The first and second profiles 105, 106 extend preferably substantially perpendicular to the wall plate 102. The proximal ends 150, 160 of the respective first and second profiles 105, 106 are attached to, preferably welded, to the wall plate 102.

The first profile 105 has an L-shape having two legs 105A, 105B. The first profile 105 is dimensioned to fit against an outer side of the tubular profile 110, as is shown in FIG. 9. One of the legs 105A of the L-shape is lying against an outer side of a wall 111 of the tubular profile 110, and the other leg 105B is lying against an outer side of a wall 112 of the tubular profile 110, which is perpendicular to wall 111.

The second profile 106 has an L-shape having two legs 106A, 106B. The second profile 106 is dimensioned to fit inside the tubular profile 110. One of the legs 106A of the L-shape is lying against an inner side of a wall 111 of the tubular profile 110 which lies opposite the other wall 111, and the other leg 106B is lying against an inner side of a wall 2 opposite the other wall 112.

The L-shaped profiles 105, 106 are arranged such that the angles of the profiles 105 and 106 are facing each other.

The legs 105A, 105B, 106A of the profiles 105 and 106 are provided with apertures 107, 108 for passing through fastening means. As is shown in FIG. 9 the profile element 110 may be provided with rows attachment holes 115 in the walls 111 and 112. Suitable fastening elements, e.g. screws or bolts, may be passed through the apertures 107, 108 and passed through the holes 115. By tightening the fastening elements the wall 111 is pressed against the leg 105A and the other opposing wall 111 is pressed against the leg 106A. The tightening forces work in the same direction. Due to this, the walls 111 of the profile element 110 will not be deformed. Since the distance between the profiles 105 and 106 is adapted to the dimension of the profile element 110, the legs 105A and 106A will fit nicely against the lateral walls 111 without any noticeable deformation when the fastening elements are tightened.

The invention claimed is:

1. A wall mounting bracket having:
   a wall plate;
   a first L-shaped protrusion attached to and extending from the wall plate and adapted to fit against an outer side of an end portion of an elongate channel profile element; and
   a second L-shaped protrusion spaced apart from the first L-shaped protrusion and attached to and extending from the wall plate and adapted to be inserted in an open end of the channel profile element;

wherein at least one of the first and second L-shaped protrusions has a wall portion having apertures for passing through fastening means to fasten the channel profile element to the support profile.

2. The wall mounting bracket according to claim 1, wherein the first L-shaped protrusion has a first angle, and the second L-shaped protrusion has a second angle, wherein the bisector of the first angle and the bisector of the second angle are intersecting perpendicularly.

3. The wall mounting bracket according to claim 1, wherein the first L-shaped protrusion has a first angle and the second L-shaped protrusion has a second angle, wherein the first and second protrusions are arranged such that the angles of the first and second protrusions are facing each other.

4. The wall mounting bracket according to claim 1, wherein the first L-shaped protrusion has longer legs than the second L-shaped protrusion.

5. The wall mounting bracket according to claim 1, wherein the wall plate is provided with bores through which suitable fastening means can pass to mount the wall mounting bracket to the wall surface.

6. An assembly comprising:
a wall plate;
a first L-shaped protrusion attached to and extending from the wall plate and adapted to fit against an outer side of an end portion of an elongate channel profile element;
a second L-shaped protrusion spaced apart from the first L-shaped protrusion and attached to and extending from the wall plate and adapted to be inserted in an open end of the channel profile element;
wherein at least one of the first and second L-shaped protrusions has a wall portion having apertures for passing through fastening means to fasten the channel profile element to the support profile,
wherein the first L-shaped protrusion has a first angle, and the second L-shaped protrusion has a second angle, wherein the bisector of the first angle and the bisector of the second angle are intersecting perpendicularly; and
wherein the elongate rail profile element has a general C-shaped cross section and comprises two opposing lateral walls and an interconnecting bottom wall extending perpendicularly to the opposing lateral walls, and wherein at the end of the respective lateral walls remote from the bottom wall a flange is formed, wherein the flanges delimit between them a longitudinal slot.

7. An assembly comprising:
a wall plate;
a first L-shaped protrusion attached to and extending from the wall plate and adapted to fit against an outer side of an end portion of a tubular elongate channel profile element;
a second L-shaped protrusion spaced apart from the first L-shaped protrusion and attached to and extending from the wall plate and adapted to be inserted in an open end of the channel profile element;
wherein at least one of the first and second L-shaped protrusions has a wall portion having apertures for passing through fastening means to fasten the channel profile element to the support profile,
wherein the first L-shaped protrusion has a first angle and the second L-shaped protrusion has a second angle, wherein the first and second protrusions are arranged such that the angles of the first and second protrusions are facing each other, and
wherein the tubular elongate profile element has a rectangular cross section and comprises two opposing walls and two interconnecting wall extending perpendicularly to the opposing walls.

* * * * *